UNITED STATES PATENT OFFICE.

AUGUSTIN PELLERIN, OF NEUILLY-SUR-SEINE, FRANCE.

PURIFIED HYDRATED CELLULOSE AND METHOD OF MANUFACTURE.

1,128,624.   Specification of Letters Patent.   Patented Feb. 16, 1915.

No Drawing.   Application filed July 8, 1910.  Serial No. 570,984.

*To all whom it may concern:*

Be it known that I, AUGUSTIN PELLERIN, a citizen of the Republic of France, residing at 84 Rue Charles Laffitte, Neuilly-sur-Seine, in the Republic of France, engineer, have invented certain new and useful Improvements in Purified Hydrated Cellulose and Methods of Manufacturing the Same, of which the following is a specification.

Cotton and its derivaties as well as chemical wood pulp generally serve as a base for cellulose solutions, but many of these celluloses are unfit for furnishing good thread producing solutions suitable for the manufacture of silk. In particular, the solution of cellulose xanthate designed to be converted into artificial silk generally have chemical wood pulp for a base. Now it often happens that solutions which are believed to be fit for the manufacture of a good artificial silk thread are found to be useless for the formation into filaments, or else only yield silks of very bad quality; the cause is nearly always the presence in the solution of a quantity, often very considerable, of various cellulose bodies or even of bodies of another nature which are not suitable for the industrial formation of a good artificial silk fiber and constitute what may be termed impurities. These impurities interpose themselves in the mass when the precipitation is taking place in the coagulating baths so that they destroy the homogeneity and, consequently, the quality of the filament. It is proved that in 100 parts of pulp employed in a solution of xanthic cellulose, the best of these chemical pulps only afford, when forming filaments, about 80 per cent. of cellulose suitable for the formation of the fibers; it is therefore natural to conclude that the 20 other parts are formed of the said impurities the action of which is distinctly injurious.

The object of this invention is to make from solutions of xanthic cellulose even from those which would be useless for the actual manufacture of artificial silk, a hydrated cellulose as homogeneous as possible freed from impure elements—that is to say, from elements which are imperfectly, or not at all, suitable for conversion into fibers, and constituting a new product for manufacture of commercial cellulose solutions.

The main feature of the invention consists in treating for this purification, not solid agglomerated masses or compact solutions, nor even finished silk threads as has hitherto been known, but a xanthic solution previously subdivided either by means of fine filtering cloths or fabrics, or by means of holes capillary or not of various forms, offering at least in one direction a very narrow section; in this manner when the thread is recovered by precipitation from this solution, a portion of impurities will be eliminated in this precipitating bath, and this elimination will continue and will become complete in the successive purifying baths.

The operation being terminated, there only therefore then remains the thread producing cellulose in a filamentous condition. This hydrated cellulose, having the advantage of constituting a product possessing the maximum of purity and homogeneity, will subsequently be more easily attackable by the solvent reagents. It can advantageously replace ordinary cellulose in all its uses, and particularly as a basis for cellulose solutions in the manufacture of artificial silk fibers and textile fibers of all kinds, or in the manufacture and composition of explosives, pellicles, plastic masses, acetates and other cellulose ethers, etc. In ordinary conditions this cellulose easily dissolves in caustic soda and the other alkalis. It has, moreover, the advantage that it can be subsequently converted into threads or other textile products, either in the pure state or mixed with the other materials by means of machines in use for ordinary textiles. If it is subjected to Eschalier's process called "stheno sage" it becomes inalterable by alkalies and more resistant to water.

Instead of dissolving and of transforming into threads or other goods the filaments of cellulose obtained as hereinbefore described, they may also be utilized directly in spinning, in the same manner as cotton or silk for instance. The means employed for the preparation of this special hydrated cellulose from xanthate are as follows: Chemical wood pulp and cotton waste, by preference, by reason of their small cost, are transformed into xanthic cellulose solution in any suitable manner; this solution is projected without order through a filtering tissue through numerous holes—having any desired regular or irregular section provided that it be very narrow at least in one direction into suitable precipitating baths, for example, sulfuric acid baths diluted to 20 degrees Baumé, baths of acid salts or other baths precipitating cellulose. For this first precipitation there is no need to take the usual precautions for the extraction of air bubbles. The coagulated material thus obtained can be collected on an endless apron immersed in the coagulating bath. The thin mass is afterward conducted by the same means into the various successive baths for effecting the purification, the fixing by dilute acid, the rinsing with water, and the desulfuration, by alkaline sulfites or bi-sulfites. The material can also be subjected to bleaching as an addition to the purification, and then again washed, aired and dried. The endless apron for the passage from one bath to another can be replaced by any other suitable arrangement; for example the winding upon cylinders of different shapes, placed along the passage from one bath to another, or any other mechanical or manual means.

Claims:

1. A process for obtaining a filamentous mass of hydrated cellulose, consisting in causing a solution of xanthic cellulose to pass through a filtering body having a great number of extremely small orifices and in receiving, in bulk, the filaments issuing from such orifices in a precipitating bath, for the purpose of obtaining a filamentous mass fit for carding and spinning.

2. A process for obtaining a filamentous mass of hydrated cellulose, consisting in causing a solution of xanthic cellulose to pass through a filtering body having a great number of extremely small orifices, and in receiving, in bulk the filaments issuing from such orifices in a precipitating bath containing a solution adapted to precipitate cellulose.

3. A process for obtaining a filamentous mass of hydrated cellulose, consisting in causing a solution of xanthic cellulose to pass through a filtering body having a great number of extremely small orifices, and in receiving the filaments issuing from such orifices, in bulk, on an endless apron moving in a precipitating bath.

4. A filamentous mass of hydrated cellulose composed of a great number of extremely small filaments placed beside one another in no definite order, such mass being fit for carding and spinning.

In testimony, that I claim the foregoing as my invention, I have signed my name in presence of two subscribing witnesses.

AUGUSTIN PELLERIN.

Witnesses:
CAMILLE BLÉTRY,
MAURICE RAUX.